US008144163B2

(12) United States Patent

Moon

(10) Patent No.: US 8,144,163 B2
(45) Date of Patent: Mar. 27, 2012

(54) DRIVING DEVICE AND DRIVING METHOD OF THE SAME

(75) Inventor: Hoi-Sik Moon, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 708 days.

(21) Appl. No.: 12/261,507

(22) Filed: Oct. 30, 2008

(65) Prior Publication Data

US 2009/0179906 A1 Jul. 16, 2009

(30) Foreign Application Priority Data

Jan. 16, 2008 (KR) ........................ 10-2008-0005080

(51) Int. Cl.

*G09G 5/00* (2006.01)
*G09G 5/02* (2006.01)
*G09G 5/10* (2006.01)
*H04N 5/202* (2006.01)
*H04N 5/46* (2006.01)
*G06K 9/40* (2006.01)
*G06K 9/00* (2006.01)
*H04N 5/00* (2006.01)
*G02F 1/13* (2006.01)
*G06K 9/32* (2006.01)

(52) U.S. Cl. .......... 345/589; 345/600; 345/204; 345/89; 345/690; 348/254; 348/557; 348/612; 349/1; 382/254; 382/274; 382/162; 382/300

(58) Field of Classification Search .................. 345/581, 345/589, 600–601, 606, 613, 618, 204, 690, 345/694, 698, 3.3, 89; 348/253–254, 557, 348/612, 725–728; 349/1; 382/162, 167, 382/254, 274, 276, 300

See application file for complete search history.

(56) References Cited

U.S. PATENT DOCUMENTS 6,040,812 A * 3/2000 Lewis ............................ 345/89

(Continued)

FOREIGN PATENT DOCUMENTS

EP 1868179 12/2007

OTHER PUBLICATIONS

Extended European Search Report issued Nov. 12, 2010 by European Patent Office re: European Application No. 08 02 2588; citing US2006/208984, US2007/241989, EP1868179 and Sang Soo Kim Development Center, et al.

(Continued)

*Primary Examiner* — Wesner Sajous
(74) *Attorney, Agent, or Firm* — Cantor Colburn LLP

(57) ABSTRACT

A display device which includes a display panel having a plurality of pixels and displaying images. Each pixel includes a data line, first and second gate lines, a first sub-pixel connected to the first gate line and the data line, and a second sub-pixel connected to the same data line and the second gate line, and a display driving unit receives an image signal, converts the image signal into a first sub image signal and a second sub image signal, supplies the first sub data voltage to the first sub-pixel through the data line and then supplies the second sub data voltage to the second sub-pixel through the same data line. The first sub data voltage corresponding to the first sub image signal, and the second sub data voltage corresponding to the second sub image signal.

18 Claims, 8 Drawing Sheets

U.S. PATENT DOCUMENTS

| | | | | |
|---|---|---|---|---|
| 2006/0208984 | A1 | 9/2006 | Kim et al. | |
| 2006/0238471 | A1* | 10/2006 | Kim et al. | 345/89 |
| 2006/0256051 | A1* | 11/2006 | Lee et al. | 345/87 |
| 2007/0241989 | A1 | 10/2007 | Kim | |
| 2008/0117348 | A1* | 5/2008 | Chen | 349/46 |
| 2008/0143912 | A1* | 6/2008 | Kim | 349/48 |
| 2008/0158120 | A1* | 7/2008 | An et al. | 345/88 |
| 2008/0204613 | A1* | 8/2008 | Kim et al. | 349/33 |
| 2010/0253867 | A1* | 10/2010 | Chung et al. | 349/38 |

OTHER PUBLICATIONS

Sang Soo Kim Development Center, et al. "66.1: Invited Paper: The World's Largest (82-in.) TFT-LCD", SID International Symposium. Boston, MA May 24-27, 2005, pp. 1842-1847, vol. XXXVI, XP007012410.

* cited by examiner

DRIVING DEVICE AND DRIVING METHOD OF THE SAME

This application claims priority to Korean Patent Application No. 10-2008-0005080 filed on Jan. 16, 2008, and all the benefits accruing therefrom under 35 U.S.C.§119, the contents of which in its entirety are incorporated herein by reference.

BACKGROUND OF THE INVENTION

1. Field of the Invention

The present invention relates to a display device and a driving method of the same.

2. Description of the Related Art

Liquid crystal displays ("LCDs") have a narrow viewing angle. To address this problem, LCDs having a wide viewing angle in a patterned vertical alignment ("PVA") mode, a multi-domain vertical alignment ("MVA") mode, and a super-patterned vertical alignment ("S-PVA") mode have been developed.

An S-PVA mode LCD includes a pixel including two sub-pixels. Different data voltages are applied to each of the sub-pixels so that transmissivity of light differs in each of the sub-pixels, and the pixel including the two sub-pixels is a middle value between two different transmissivity values. A lateral viewing angle of an LCD can be enlarged using the S-PVA mode.

However, in the conventional LCD, data voltages applied to two sub-pixels cannot be independently controlled, making it difficult to further increase the display quality of the liquid crystal display.

BRIEF SUMMARY OF THE INVENTION

The present invention has made an effort to solve the above stated problems, and aspects of the present invention provide a display device which can improve display quality and a method of driving the display device which can improve the display quality of the display device.

In an exemplary embodiment, the present invention provides a display device including a display panel having a plurality of pixels and displays images, each pixel including a data line, first and second gate lines, a first sub-pixel connected to the first gate line and the data line, and a second sub-pixel connected to the data line and the second gate line, and a display driving unit which receives an image signal, converts the image signal into a first sub-image signal and a second sub-image signal, supplies a first sub-data voltage to the first sub-pixel through the data line and then supplies a second sub-data voltage to the second sub-pixel through the data line, the first sub-data voltage corresponding to the first-sub image signal, and the second sub-data voltage corresponding to the second sub-image signal.

According to another exemplary embodiment, the present invention provides a display device including a display panel having first to nth rows of pixels, an ith pixel row (1≦i≦n) including a plurality of pixels, each pixel having a first sub-pixel and a second sub-pixel, and a display driving unit which receives a plurality of image signals, converts the plurality of image signals into a plurality of first sub-image signals and a plurality of second sub-image signals, supplies a plurality of first sub-data voltages corresponding to the plurality of first sub-image signals to the plurality of first sub-pixels of the ith pixel row and then supplies a plurality of second sub-data voltages corresponding to the plurality of second sub-image signals to the plurality of second sub-pixels of the ith pixel row.

According to still another exemplary embodiment, the present invention provides a method of driving a display device having first to nth rows of pixels, an ith pixel row (1≦i≦n) including a plurality of pixels, each pixel having a first sub-pixel and a second sub-pixel, the method including receiving a plurality of image signals, converting the plurality of image signals into a plurality of first sub-image signals and a plurality of second sub-image signals, supplying a plurality of first sub- data voltages corresponding to the plurality of first sub-image signals to the plurality of first sub-pixels of the ith pixel row, and supplying a plurality of second sub-data voltages corresponding to the plurality of second sub-image signals to the plurality of second sub-pixels of the ith pixel row.

BRIEF DESCRIPTION OF THE DRAWINGS

The above and/or other aspects, features and advantages of the present invention will become more apparent from the following detailed description when taken in conjunction with the accompanying drawings, in which.

DETAILED DESCRIPTION OF THE INVENTION

Figure 1:
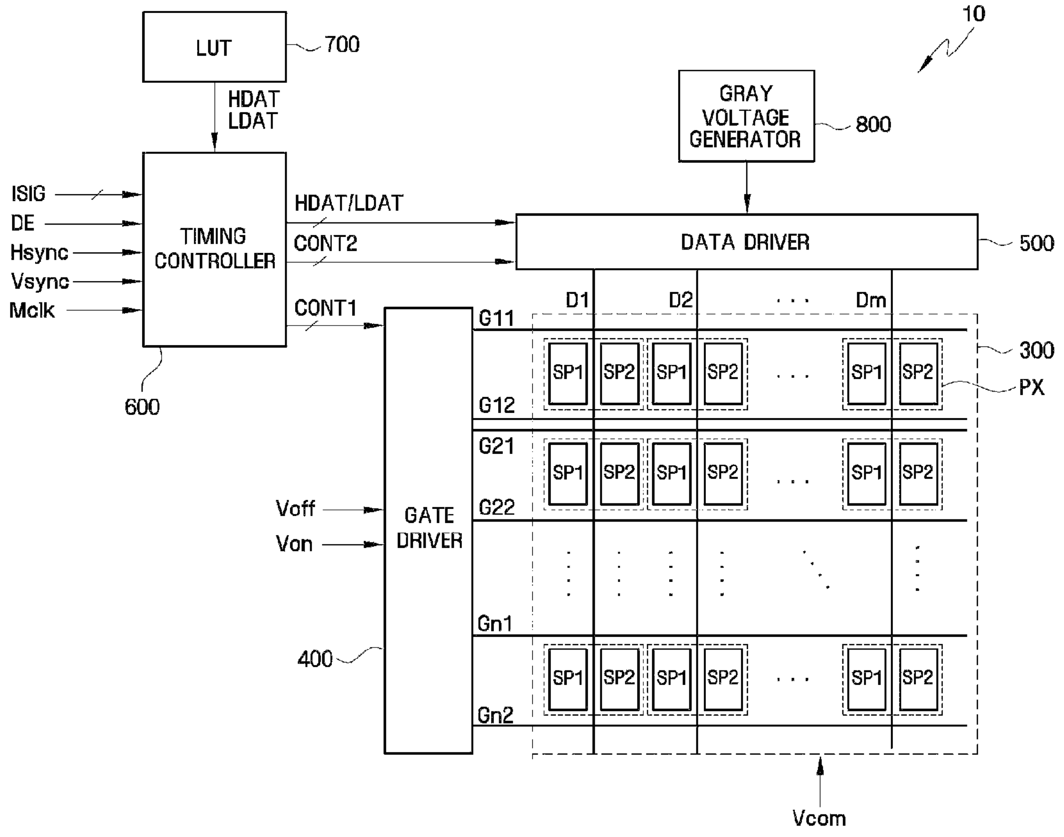
FIG. 1 is a block diagram illustrating an exemplary embodiment of a display device according to the present invention.

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 4A:
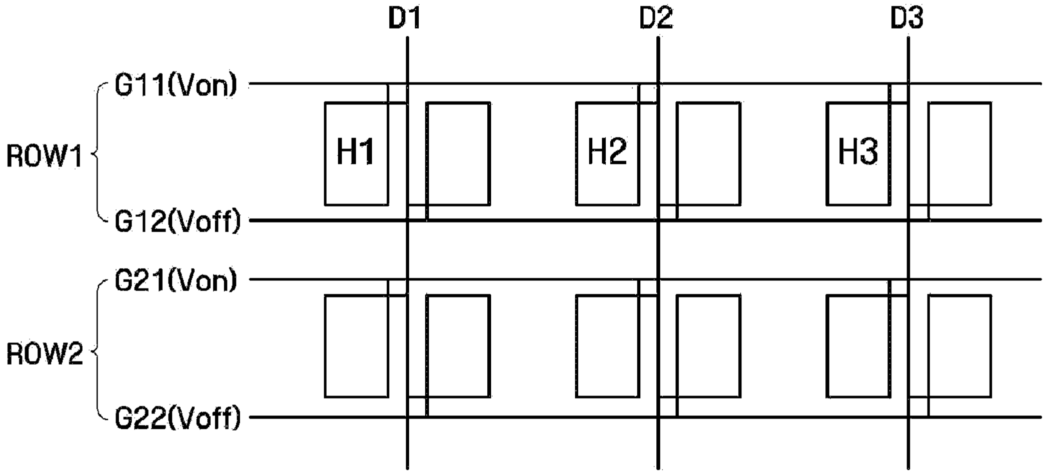
Figure 4B:
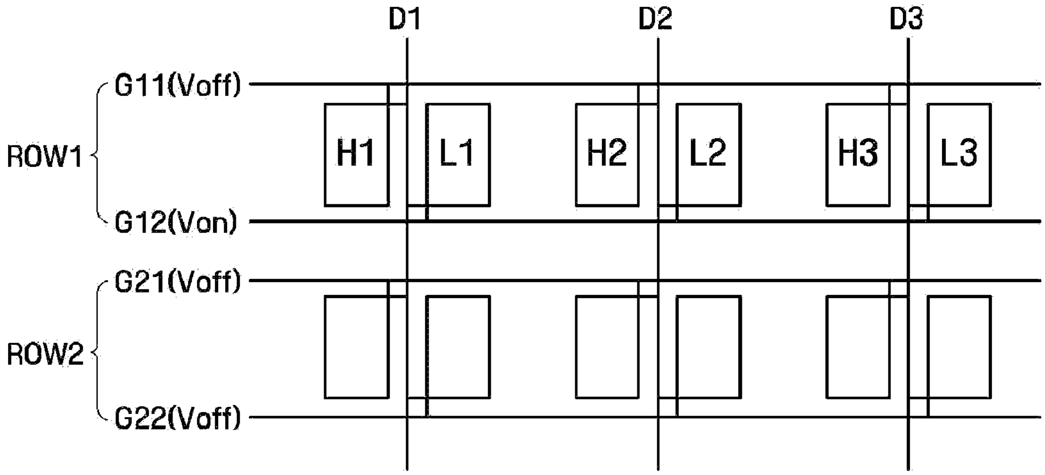
Figure 4C:
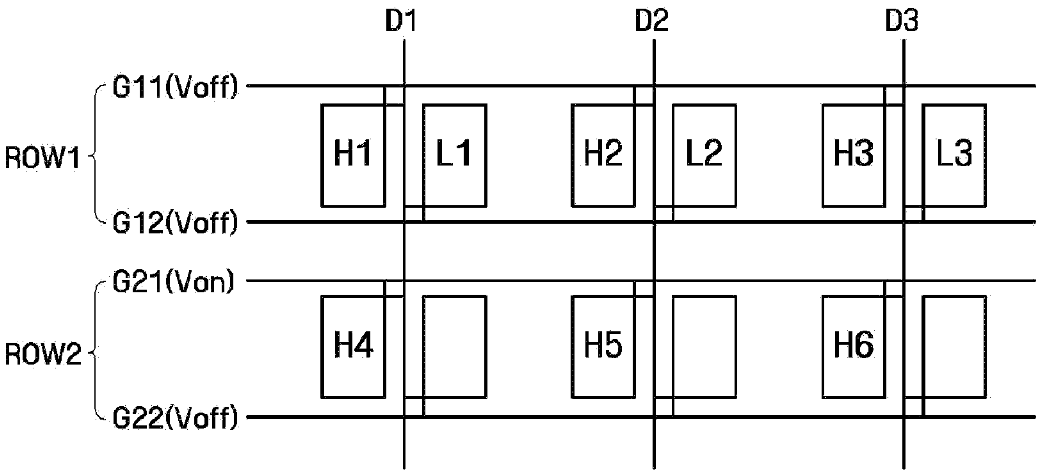
Figure 4D:
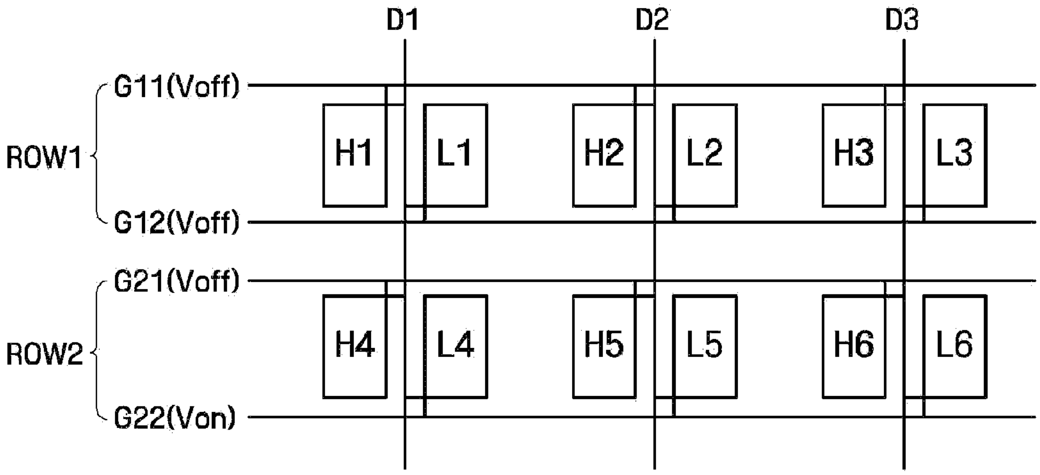
Figure 5:
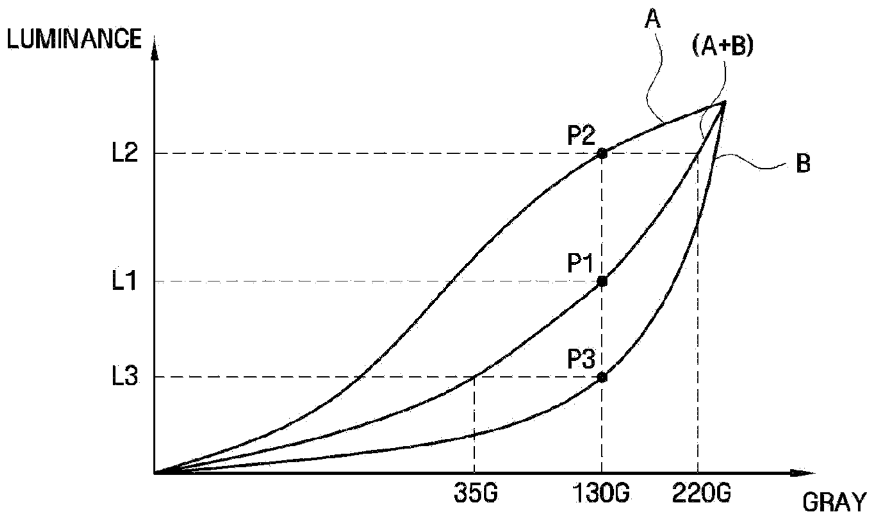
FIG. 5 is a graph illustrating an exemplary embodiment of first and second sub-image signals stored in a look-up table shown in FIG. 1 according to the present invention.

A display device according to an exemplary embodiment of the present invention and a driving method of the same will now be explained in more detail with reference to FIGS. 1 through 4D. FIG. 1 is a block diagram illustrating an exemplary embodiment of a display device according to the present invention, FIG. 2 is an equivalent circuit diagram of an exemplary embodiment of a pixel of the display device shown in FIG. 1, FIGS. 3 through 4D are signal waveform and conceptual diagrams for explaining an exemplary embodiment of an operation of a display driving unit, and FIG. 5 is a graph illustrating an exemplary embodiment of first and second sub-image signals stored in a look-up table shown in FIG. 1 according to the present invention.

Referring to FIG. 1, a liquid crystal display ("LCD") 10 according to an exemplary embodiment of the invention includes a liquid crystal panel 300, a display driving unit, a LUT 700, and a gray voltage generator 800. The display driving unit includes a gate driver 400, a data driver 500, and a timing controller 600 controlling the gate driver 400 and the data driver 500.

According to an exemplary embodiment, the liquid crystal panel 300 includes first through nth pixel columns, and a plurality of pixels PX, each pixel PX including a first sub-pixel SP1 and a second sub-pixel SP2. Two gate lines G11~Gn2 at each pixel row. Data lines D1-Dm formed between the first and second sub-pixels SP1 and SP2 extend in a column direction and are parallel to each other.

Figure 2:
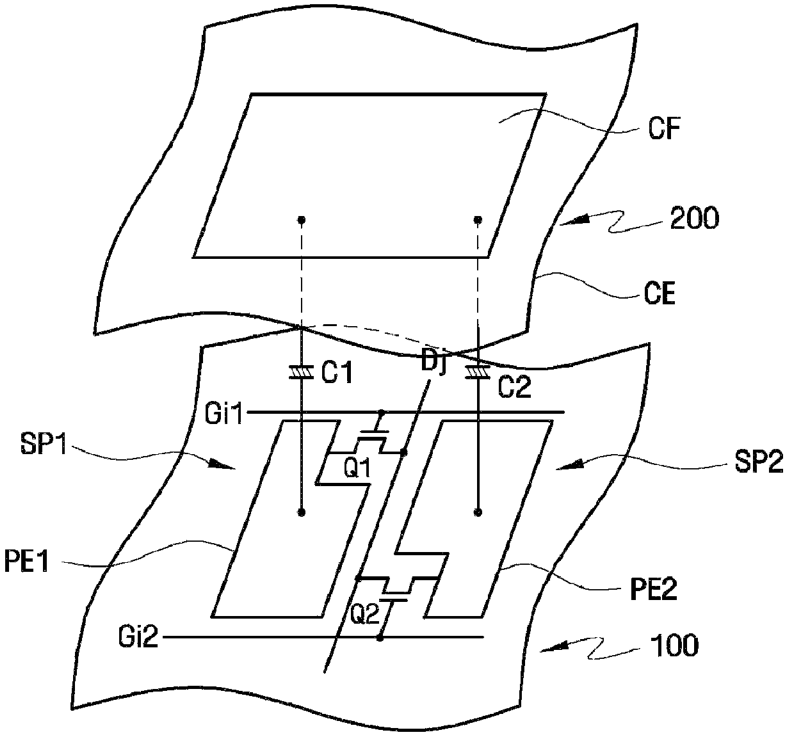
FIG. 2 is an equivalent circuit diagram of an exemplary embodiment of a pixel of the display device shown in FIG. 1 according to the present invention.

Referring to FIG. 2, each pixel PX includes a first sub-pixel SP1 and a second sub-pixel SP2. The first sub-pixel SP1 is connected to a first gate line Gi1 and a data line Dj, and the second sub-pixel SP2 is connected to a second gate line Gi2 and the same data line Dj. That is, the first sub-pixel SP1 and the second sub-pixel SP2 share the same data line. The first sub-pixel SP1 and the second sub-pixel SP2 are formed between a first substrate 100 and a second substrate 200. The first sub-pixel SP1 includes a first liquid crystal ("LC") capacitor C1 and a first switching element Q1, and the second sub-pixel SP2 includes a second LC capacitor C2 and a second switching element Q2. The first sub-pixel SP1 includes a first pixel electrode PE1 formed on the first substrate 100, a common electrode CE formed on the second substrate 200, and a liquid crystal layer (not shown) interposed between therebetween. The sub-pixel SP2 includes a second pixel electrode PE2 formed on the first substrate 100, the same common electrode CE formed on the second substrate 200, and a liquid crystal layer (not shown) interposed between therebetween. According to an exemplary embodiment of the present invention, the second substrate 200 further includes a color filter CF (as shown in FIG. 2).

A first sub data voltage and a second sub data voltage having different voltage levels are sequentially applied to each pixel PX through the data line Dj, respectively. For example, the first sub data voltage is first applied to the first sub-pixel SP1 and the second sub data voltage is then applied to the second sub-pixel SP2. According to an exemplary embodiment, when the first sub data voltage is applied to the first sub-pixel SP1, the light supplied from a backlight assembly (not shown) is transmitted through the first sub-pixel SP1 as first transmissivity corresponding to the first sub data voltage. Further, when the second sub data voltage is applied to the second sub-pixel SP2, the light is transmitted through the second sub-pixel SP2 as second transmissivity corresponding to the second sub data voltage. Thus, according to an exemplary embodiment, an image of a pixel PX is displayed in brightness corresponding to a predetermined level of transmissivity between the first transmissivity and the second transmissivity.

Referring back to FIG. 1, as mentioned above, the display driving unit includes a timing controller 600, a gate driver 400 and a data driver 500. The display driving unit is supplied with a plurality of image signals ISIG and converts the respective image signals ISIG into a plurality of first sub image signals HDAT and a plurality of second sub image signals LDAT. The display driving unit supplies a plurality of first sub-pixels SP1 of an ith row of pixels (1≦i≦n) with a plurality of first sub data voltages corresponding to the plurality of first sub image signals HDAT, and then supplies a plurality of second sub-pixels SP2 of the ith row of pixels with a plurality of second sub data voltages corresponding to the plurality of second sub image signals LDAT. The operations of the display driving unit will now be described in more detail.

The timing controller 600 is supplied by an external graphic controller (not illustrated) with input control signals, generates gate control signals CONT1 and data control signals CONT2 based on the input control signals, and provides the gate control signals CONT1 to the gate driver 400 and the data control signals CONT2 to the data driver 500. In the current exemplary embodiment, the input control signals include, for example, a vertical synchronization signal Vsync, a horizontal synchronization signal Hsync, a main clock MCLK, and a data enable signal DE. The gate control signals CONT1 which control the operation of the gate driver 400 includes a scanning start signal which instructs a start scanning operation of the gate driver 400, a gate clock signal which controls an output time of a gate-on voltage Von, and an output enable signal which defines a duration of the gate-on voltage Von. The data control signals CONT2 which control the operation of the data driver 500 include a horizontal synchronization start signal which starts the operation of the data driver 500, and output instruction signals which instruct an output of two data voltages.

Further, the timing controller 600 which receives a plurality of image signals ISIG, reads a plurality of first sub image signals HDAT and a plurality of second sub image signals LDAT from a lookup table ("LUT") 700 and sequentially outputs the same. In addition, the timing controller 600 receives image signals ISIG supplied to a row of pixels PX, and outputs the plurality of first sub image signals HDAT supplied to first sub-pixels SP1 and then the plurality of second sub image signals LDAT supplied to the plurality of second sub-pixels SP2 of a row of pixels.

Figure 3:
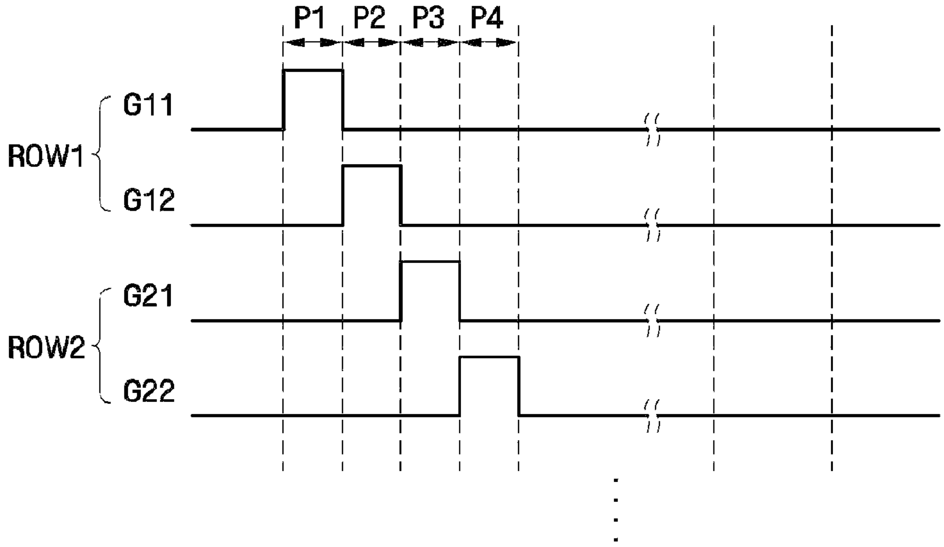
FIGS. 3 through 4D are signal waveform and conceptual diagrams for explaining an exemplary embodiment of an operation of a display driving unit according to the present invention.

The gate driver 400 further sequentially outputs externally applied gate-on voltage Von and gate-off voltage Voff to a plurality of gate lines G11-Gn2 in response to the gate control signals CONT1 supplied from the timing controller 600, as shown in FIG. 3.

Referring to FIG. 3, according to an exemplary embodiment, assuming that a time in which a row of pixels are activated to receive a data voltage, is called "one horizontal period" (which is also denoted by "1H"), first and second gate lines of each row of pixels are sequentially activated during one horizontal period (1 H). That is, in the first horizontal period (1H), a first gate line G11 of a first pixel row ROW1 is activated during a first period P1 and a second gate line G12 of the first pixel row ROW1 is activated during a second period P2. In the second horizontal period (1H), a first gate line G21 of a second pixel row ROW2 is activated during a third period P3 and a second gate line G22 of the second pixel row ROW2 is activated during a fourth period P4.

Further, in response to the data control signals CONT2 supplied from the timing controller 600, the data driver 500 shown in FIG. 1 applies the plurality of first sub data voltages corresponding to the plurality of first sub image signals HDAT to data lines D1-Dm, and then the plurality of second sub data voltages corresponding to the plurality of second sub image signals LDAT to the respective data lines. The data driver 500 receives the plurality of first sub data voltages corresponding to the plurality of first sub image signals HDAT and the plurality of second sub data voltages corresponding to the plurality of second sub image signals LDAT from the gray voltage generator 800, which will now be described in more detail with reference to FIGS. 3 and 4A through 4D.

During the first period P1, the gate-on voltage Von is applied to the first gate line G11 of the first pixel row ROW1 and the gate-off voltage Voff is applied to the remaining gate lines G12, G21, and G22. The data driver 500 first applies a plurality of first sub data voltages H1, H2, and H3 to the data lines D1, D2, and D3, respectively. Accordingly, as shown in FIG. 4A, according to an exemplary embodiment, the first sub data voltages H1, H2, and H3 are supplied to the plurality of first sub-pixels SP1 of the first pixel row ROW1.

During the second period P2, the gate-on voltage Von is applied to the second gate line G12 of the first pixel row ROW1 and the gate-off voltage Voff is applied to the remaining gate lines G11, G21, and G22. The data driver 500 applies a plurality of second sub data voltages L1, L2, and L3 to the data lines D1, D2, and D3, respectively. Accordingly, as shown in FIG. 4B, the second sub data voltages L1, L2, and L3 are supplied to the plurality of second sub-pixels SP2 of the first pixel row ROW1.

Further, as shown, during the third period P3, the gate-on voltage Von is applied to the first gate line G21 of the second pixel row ROW2 and the gate-off voltage Voff is applied to the remaining gate lines G11, G12, and G22. The data driver 500 applies a plurality of first sub data voltages H4, H5, and H6 to the data lines D1, D2, and D3, respectively. Accordingly, as shown in FIG. 4C, the first sub data voltages H4, H5, and H6 are supplied to the plurality of first sub-pixels SP1 of the second pixel row ROW2.

During the fourth period P4, the gate-on voltage Von is applied to the second gate line G22 of the second pixel row ROW2 and the gate-off voltage Voff is applied to the remaining gate lines G11, G21, and G22. The data driver 500 applies a plurality of second sub data voltages L4, L5 and L6 to the data lines D1, D2, and D3, respectively. Accordingly, as shown in FIG. 4D, the second sub data voltages L4, L5 and L6 are supplied to the plurality of second sub-pixels SP2 of the second pixel row ROW2.

The first sub image signals HDAT and the second sub image signals LDAT stored in the LUT 700 will now be described with reference to FIG. 5.

FIG. 5 illustrates gamma curves representing luminance properties according to the gray scale levels applied to the liquid crystal panel 300, according to an exemplary embodiment of the present invention. As shown, a gamma curve A of the first sub-pixel SP1 and a gamma curve B of the second sub-pixel which allow the liquid crystal panel 300 to have optimal side visibility are set in a method of fabricating the liquid crystal display device 10. According to the current exemplary embodiment, the gamma curve A of the first sub-pixel and the gamma curve B of the second sub-pixel y vary depending on characteristics and functions of the liquid crystal display 10.

Data voltage representing the same gray scale level is applied to the first and second sub-pixels of the liquid crystal panel 300 and then the luminance property in front of the liquid crystal panel 300 is detected, thereby obtaining gamma curve A+B in front of the liquid crystal panel 300. The first sub image signals HDAT and the second sub image signals LDAT are stored in the LUT 700 using the frontal gamma curve A+B of the liquid crystal panel 300 and the preset gamma curves A and B of the first and second sub-pixels SP1 and SP2.

According to an exemplary embodiment, when sub data voltages corresponding to the same gray level i.e., a first gray level 130G, are applied to the first sub-pixel SP1 and the second sub-pixel SP2 of the liquid crystal panel 300, the liquid crystal panel 300 has a first luminance value L1 at a front side. A second contact point P2 and a third contact point P3 are obtained from the gamma curve A of the first sub-pixel SP1 and the gamma curve B of the second sub-pixel SP2, respectively, by extending a straight line from a first contact point P1 of the first gray level 130G applied to the liquid crystal panel 300 and the first luminance value L1 detected from the liquid crystal panel 300 along the luminance-axis (y-axis) direction. The second contact point P2 includes a second luminance value L2 on the gamma curve A of the first sub-pixel SP1. On the frontal gamma curve A+B of the liquid crystal panel 300, the gray scale level corresponding to the second luminance value L2 is a second gray level 220G. Similarly, the third contact point P3 includes a third luminance value L3 on the gamma curve B of the second sub-pixel SP2. On the frontal gamma curve A+B of the liquid crystal panel 300, the gray scale level corresponding to the third luminance value L3 is a third gray level 35G.

That is, in order to represent gamma characteristics in front of the liquid crystal panel 300 as the first contact point P1, it is necessary to apply a sub data voltage corresponding to the second gray level 220G to the first sub-pixel SP1 while applying a sub data voltage corresponding to the third gray level 35G to the second sub-pixel SP2.

In the above-described manner, according to the respective gray levels of externally input image signals ISIG to be applied to the first and second sub-pixels SP1 and SP2, the first sub image signal HDAT and the second sub image signal LDAT respectively corresponding to a first sub data voltage and a second sub data voltage are stored in the LUT 700.

As described above, according to an exemplary embodiment, since the image signals ISIG are converted into the first and second sub image signals LDAT capable of optimizing lateral visibility and the first and second sub data voltages for the first and second sub image signals LDAT are then supplied to the first and second sub-pixels SP1 and SP2, the display quality can be improved.

Meanwhile, since first and second sub-pixels SP1 and SP2 share a single (i.e., same) data line, the display driving unit first applies a plurality of first sub data voltages to the respective data lines D1-Dm and then applies a plurality of second sub data voltages to the data lines D1-Dm.

A driving operation of the display driving unit according to an exemplary embodiment will now be described. First, the timing controller 600 first applies a plurality of first sub image signals HDAT and then applies a plurality of second sub data image signals LDAT to the data lines D1-Dm. Here, the data driver 500 first converts the plurality of first sub image signals HDAT sequentially output from the timing controller 600 into the first sub data voltages to then output the same and then converts the second sub image signals LDAT into the second sub data voltages to then output the same.

A driving operation of the display driving unit according to another exemplary embodiment will now be described. The timing controller 600 outputs first and second sub image signals HDAT and LDAT corresponding to input image signals ISIG. Then, among the output plurality of first and second sub image signals HDAT and LDAT, the data driver 500 first converts the plurality of first sub image signals HDAT into a plurality of first sub data voltages to then output the same, and then converts the plurality of second sub image signals LDAT into a plurality of second sub data voltages to then output the same.

The display device according to exemplary embodiments of the present invention operates in various ways without being limited to the above-mentioned driving operations. In the following description, the display device operating according to the present invention will be described in detail with reference to several exemplary embodiments.

Figure 6:
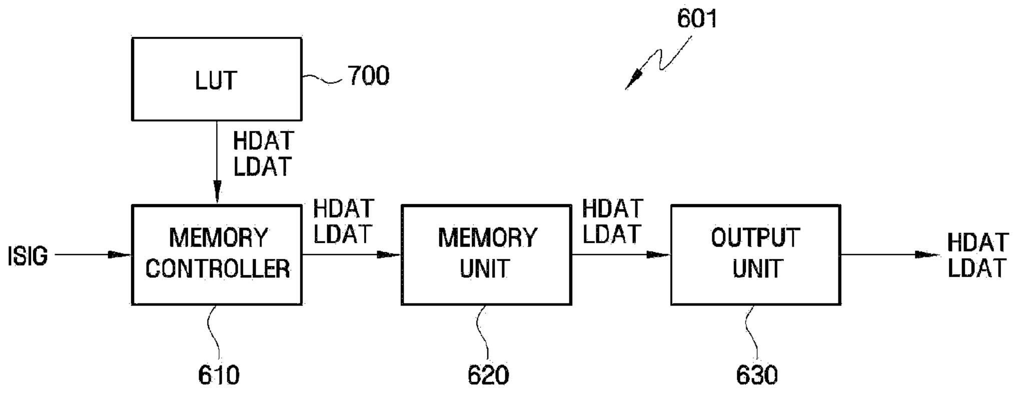
FIG. 6 is a block diagram of an exemplary embodiment of a timing controller in a display device according to the present invention.
Figure 7:
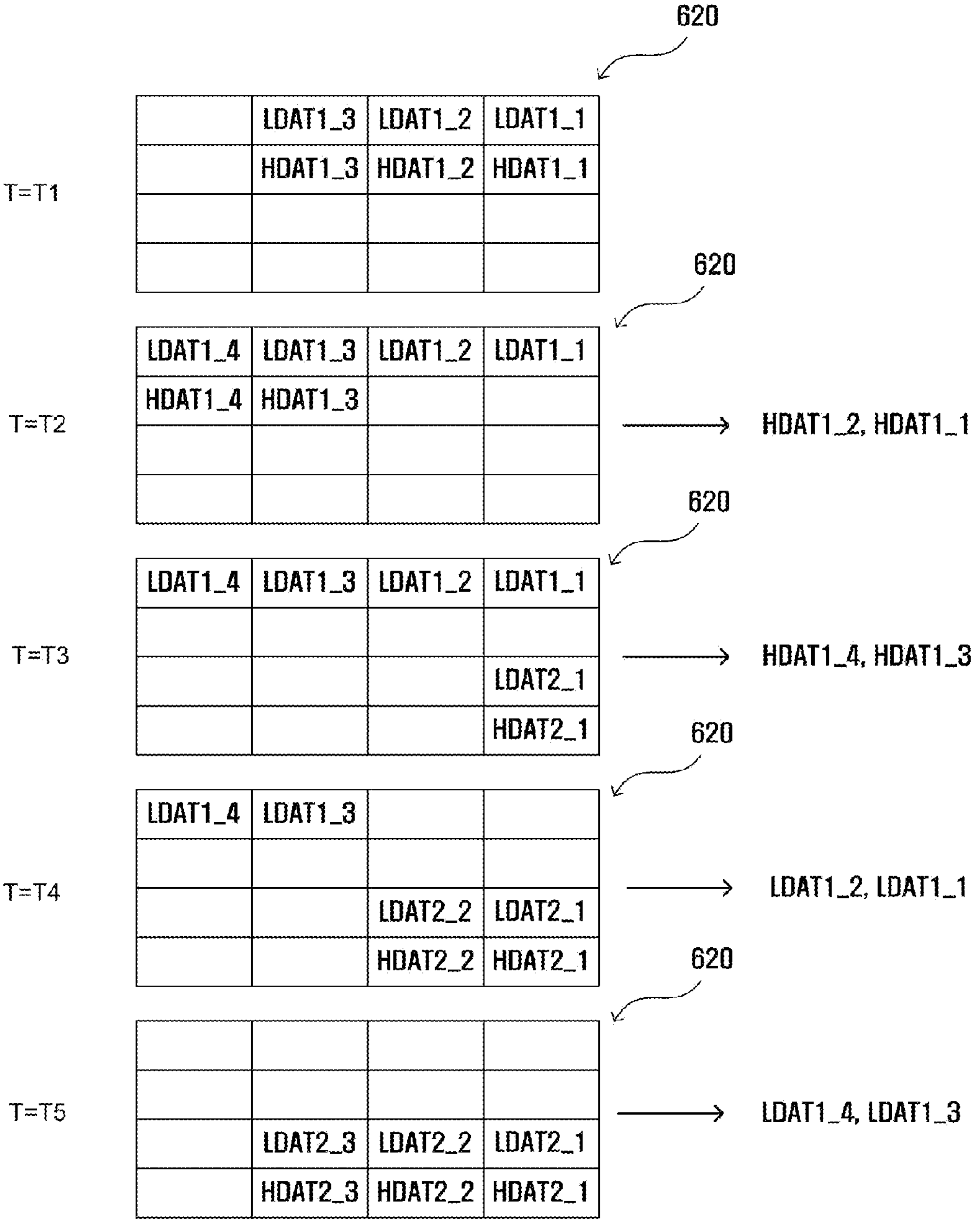
FIG. 7 is a conceptual diagram for explaining an exemplary embodiment of an operation of the timing controller shown in FIG. 6 according to the present invention.

A display device according to an embodiment of the present invention will be described with reference to FIGS. 6 and 7. FIG. 6 is a block diagram of a timing controller in a display device according to an exemplary embodiment of the present invention and a driving method of the same, and FIG. 7 is a conceptual diagram for illustrating an operation of the timing controller shown in FIG. 6.

Referring to FIG. 6, according to an exemplary embodiment, the timing controller 601 includes a memory controller 610, a memory unit 620 and an output unit 630.

The memory controller 610 receives a plurality of image signals ISIG, reads a plurality of first sub image signals HDAT and a plurality of second sub image signals LDAT from a LUT 700 and sequentially outputs the same. In the current exemplary embodiment, the memory controller 610 reads the first sub image signals HDAT and the second sub image signals LDAT simultaneously or sequentially.

The memory unit 620 stores the first sub image signals HDAT and the second sub image signals LDAT output from the memory controller 610. In order to store the plurality of first sub image signals HDAT to be supplied to a plurality of first sub-pixels SP1 of a row of pixels, prior to storing of the plurality of sub image signals LDAT, the memory unit 620 stores the plurality of first sub image signals HDAT and the plurality of second sub image signals LDAT. The output unit 630 outputs, first, the plurality of first sub image signals HDAT stored in the memory unit 620 to then outputs the plurality of second sub image signals LDAT.

The operations of the memory unit 620 and the output unit 630 will be described in greater detail with reference to FIG. 7. In the following description, the operations will be described in a case where four pixels PX are included in a single pixel row. A pixel row PX includes four (4) first sub-pixels SP1 and 4 second sub-pixels SP2. However, the present invention is not limited hereto, and may vary accordingly.

First, as shown in FIG. 7, at time T1, the memory unit 620 stores three (3) first sub image signals HDAT1_1, HDAT1_2, and HDAT1_3 to be supplied to three (3) first sub-pixels SP1 of a first pixel row and 3 second sub image signals LDAT1_1, LDAT1_2, and LDAT1_3 to be supplied to 3 second sub-pixels SP2 of a second pixel row.

Next, when the memory controller 610 supplies a first sub image signal HDAT1_4 and a second sub image signal LDAT1_4 to be supplied to fourth pixels PX of the first pixel row, at time T2, the memory unit 620 stores the first sub image signal HDAT1_4 and the second sub image signal LDAT1_4. At this time, the output unit 630 outputs the first and second sub image signals HDAT1_1 and HDAT1_2 to be supplied to the first and second pixels PX.

Next, when the memory controller 610 supplies a first sub image signal HDAT2_1 and a second sub image signal LDAT2_1 to be supplied to first pixels PX of the second pixel row, at time T3, the memory unit 620 stores the first sub image signal HDAT2_1 and the second sub image signal LDAT2_1. At this time, the output unit 630 outputs the first and second sub image signals HDAT1_3 and HDAT1_4 to be supplied to third and fourth pixels PX of the first pixel row.

When the memory controller 610 supplies a first sub image signal HDAT2_2 and a second sub image signal LDAT2_2 to be supplied to the second pixels PX of the second pixel row, at time T4, the memory unit 620 stores a first sub image signal HDAT2_2 and a second sub image signal LDAT2_2. Then, the output unit 630 outputs the first and second sub image signals LDAT1_1 and LDAT1_2 to be supplied to the first and second pixels PX of the first pixel row.

When the memory controller 610 supplies a first sub image signal HDAT2_3 and a second sub image signal LDAT2_3 to be supplied to the third pixels PX of the second pixel row, at time T5, the memory unit 620 stores a first sub image signal HDAT2_3 and a second sub image signal LDAT2_3. Then, the output unit 630 outputs first and second sub image signals LDAT1_3 and LDAT1_4 to be supplied to the third and fourth pixels PX of the first pixel row.

Accordingly, the memory unit 620 stores a plurality of first sub image signals HDAT and a plurality of second sub image signals LDAT output from the memory controller 610. The output unit 630 first outputs the plurality of first sub image signals HDAT for pixels of a given row from the memory unit 620 and then outputs the plurality of second sub image signals LDAT for the pixels of the given row.

Figure 8:
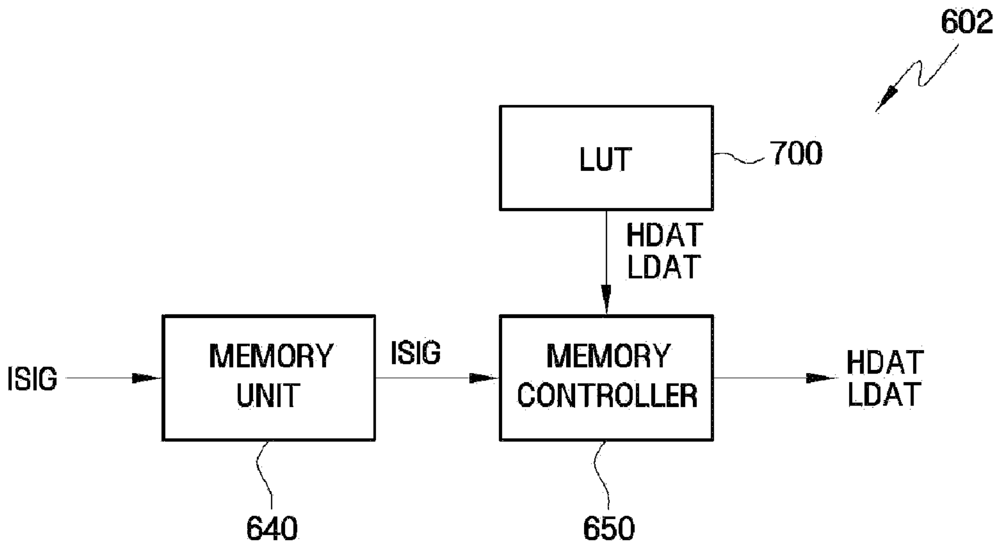
FIG. 8 is a block diagram of another exemplary embodiment of a timing controller in a display device according to the present invention.
Figure 9:
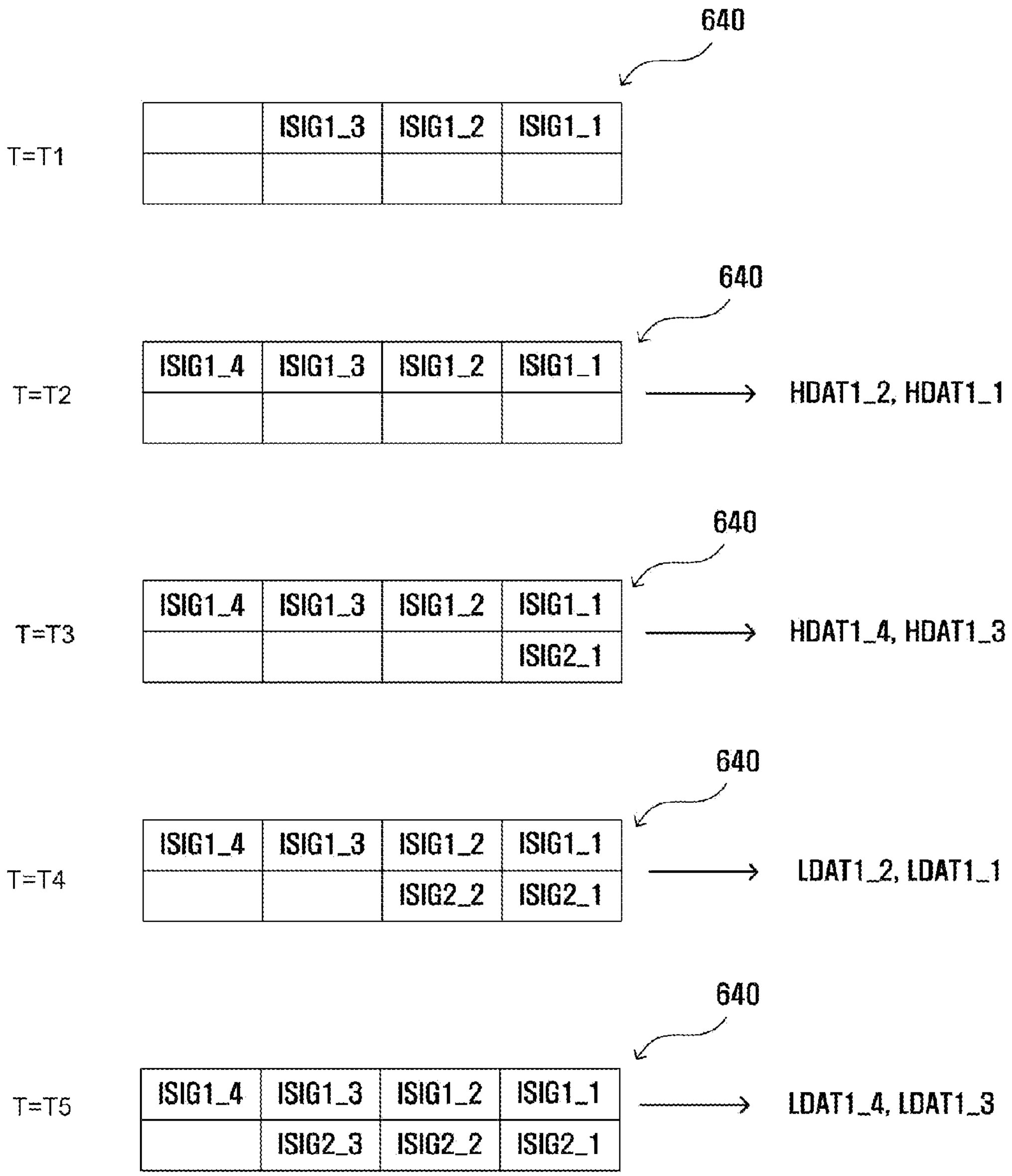
FIG. 9 is a conceptual diagram for explaining an exemplary embodiment of an operation of the timing controller shown in FIG. 8 according to the present invention.

A display device according to another exemplary embodiment of the present invention and a driving method of the same will now be described with reference to FIGS. 8 and 9. FIG. 8 is a block diagram of a timing controller in a display device according to another exemplary embodiment of the present invention and a driving method of the same, and FIG. 9 is a conceptual diagram for illustrating an operation of the timing controller shown in FIG. 8. For brevity, components having substantially the same function as the exemplary embodiment shown in FIG. 6 are identified by the same reference numerals, and detailed descriptions thereof will be omitted.

Referring to FIG. 8, according to the current exemplary embodiment, the timing controller 602 includes a memory unit 640 and a memory controller 650.

The memory unit 640 receives and stores image signals ISIG. The memory controller 650 receives the image signals ISIG stored in the memory unit 640, reads and outputs, first, a plurality of first sub image signals HDAT corresponding to the received image signals ISIG to then reads and outputs a plurality of second sub image signals LDAT.

The operations of the memory unit 640 and the memory controller 650 will be described in greater detail with reference to FIG. 9. In the following description, the operations will be explained in a case where four pixels PX are included in a single pixel row. A pixel row PX includes four (4) first sub-pixels SP1 and 4 second sub-pixels SP2.

First, as shown in FIG. 9, at time T1, the memory unit 640 stores three (3) image signals ISIG1_1, ISIG1_2, and ISIG1_3 to be supplied to three (3) pixels SP1 of a first pixel row.

Further, at time T2, the memory unit 640 stores an image signal ISIG1_4 to be supplied to a fourth pixel PX of the first pixel row. Here, the memory controller 650 receives, the image signal ISIG1_1 to be supplied to the first pixel PX of the first pixel row, reads the first sub image signal HDAT1_1 corresponding to the image signal ISIG1_1 from the LUT 700, and outputs the same. Then, the memory controller 650 receives the image signal ISIG1_2 to be supplied to the second pixel PX of the first pixel row, reads the first sub image signal HDAT1_2 corresponding to the image signal ISIG1_2 from the LUT 700, and outputs the same.

At time T3, the memory unit 640 stores an image signal ISIG2_1 to be supplied to a first pixel PX of a second pixel row. In the current exemplary embodiment, the memory controller 650 receives, the image signal ISIG1_3 to be supplied to a third pixel PX of the first pixel row, reads the first sub image signal HDAT1_3 corresponding to the image signal ISIG1_3 from the LUT 700, and outputs the same. Then, the memory controller 650 receives an image signal ISIG1_4 to be supplied to a fourth pixel PX of the first pixel row, reads a first sub image signal HDAT1_4 corresponding to the image signal ISIG1_4 from the LUT 700, and outputs the same.

Further, at time T4, the memory unit 640 stores an image signal ISIG2_2 to be supplied to a second pixel PX of a second pixel row. Here, the memory controller 650 receives, first, the image signal ISIG1_1 to be supplied to the first pixel PX of the first pixel row, reads a second sub image signal LDAT1_1 corresponding to the image signal ISIG1_1 from the LUT 700, and outputs the same. Then, the controller 650 receives the image signal ISIG1_2 to be supplied to the second pixel PX of the first pixel row, reads a second sub image signal LDAT1_4 corresponding to the image signal ISIG1_2 from the LUT 700, and outputs the same.

At time T5, the memory unit 640 stores an image signal ISIG2_3 to be supplied to a third pixel PX of a second pixel row. Here, the memory controller 650 receives, first, the image signal ISIG1_3 to be supplied to a third pixel PX of the first pixel row, reads a second sub image signal LDAT1_3 corresponding to the image signal ISIG1_3 from the LUT 700, and outputs the same. Next, the controller 650 receives the image signal ISIG1_4 to be supplied to a fourth second pixel PX of the first pixel row, reads the second sub image signal LDAT1_4 corresponding to the image signal ISIG1_4 from the LUT 700, and outputs the same.

Accordingly, the memory unit 640 stores a plurality of image signals ISIG, and the memory controller 650 reads and outputs, a plurality of first sub image signals HDAT corresponding to the image signals for pixels of a given row, and then reads and outputs a plurality of second sub image signals LDAT for pixels of a given row.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display device comprising:

a display panel having a plurality of pixels and displaying images, each pixel comprising a data line, first and second gate lines, a first sub-pixel connected to the first gate line and the data line, and a second sub-pixel connected to a same data line and the second gate line; and a display driving unit which receives an image signal, converts the image signal into a first sub image signal and a second sub image signal, supplies a first sub data voltage to the first sub-pixel through the data line and subsequently supplies a second sub data voltage to the second sub-pixel through the same data line after supplying the first sub data voltage to the first sub-pixel, the first sub data voltage corresponding to the first sub image signal, and the second sub data voltage corresponding to the second sub image signal, wherein a gate-on voltage is sequentially applied to the first and second gate lines such that the first and second sub pixels are sequentially supplied with the first and second sub data voltages.

2. The display device of claim 1, wherein the first sub image signal and second sub image signal comprise different gray scales and the first sub data voltage and the second sub data voltage comprise different voltage levels.

3. The display device of claim 2, wherein a gray level of the first sub image signal is greater than or equal to that of the image signal and a gray level of the second sub image signal is smaller than or equal to that of the image signal.

4. The display device of claim 1, further comprising a look-up table which stores the first sub image signal and second sub image signal.

5. The display device of claim 4, wherein the display driving unit comprises:

a timing controller which reads the first and second sub image signals corresponding to the image signal from the look-up table and sequentially outputs the first and second sub image signals; and a data driver which supplies the first and second sub data voltages corresponding to the read first and second sub image signals.

6. A display device comprising:

a display panel comprising first to nth rows of pixels, an ith pixel row ($1 \leqq i \leqq n$) of the first to nth rows of pixels comprising a plurality of pixels, each pixel having a first sub-pixel and a second sub-pixel; and a display driving unit which receives a plurality of image signals, converts the plurality of image signals into a plurality of first sub image signals and a plurality of second sub image signals, supplies a plurality of first sub data voltages corresponding to the plurality of first sub image signals to the plurality of first sub-pixels of the ith pixel row and subsequently supplies a plurality of second sub data voltages corresponding to the plurality of second sub image signals to the plurality of second sub-pixels of the ith pixel row after supplying the plurality of first sub data voltages, wherein a gate-on voltage is sequentially applied such that the first and second sub pixels are sequentially supplied with the first and second sub data voltages.

7. The display device of claim 6, further comprising a look-up table which stores the plurality of first sub image signals and the plurality of second sub image signals.

8. The display device of claim 7, wherein the display driving unit reads the plurality of first and second sub image signals corresponding to the plurality of image signals from the look-up table, outputs the plurality of first sub image signals, and subsequently outputs the plurality of second sub image signals after outputting the plurality of first sub image signals.

9. The display device of claim 8, wherein the display driving unit comprises:

a memory controller which reads the plurality of first and second sub image signals corresponding to the plurality of image signals from the look-up table;

a memory unit which stores the plurality of first and second sub image signals read from the look-up table;

an output unit which outputs the plurality of first sub image signals stored in the memory unit and subsequently outputs the plurality of second sub image signals stored in the memory unit after outputting the plurality of first sub image signals; and a data driver which converts the plurality of first and second sub image signals output from the output unit into the plurality of first sub data voltages and the plurality of second sub data voltages, and supplies the plurality of first sub data voltages and the plurality of second sub data voltages to the plurality of first sub-pixels and the plurality of second sub-pixels.

10. The display device of claim 7, wherein the display driving unit reads the plurality of first sub image signals corresponding to the plurality of image signals from the look-up table and outputs the read first sub image signals, and reads the plurality of second sub image signals corresponding to the plurality of image signals from the look-up table and outputs the read second sub image signals.

11. The display device of claim 10, wherein the display driving unit comprises:

a memory unit which stores the plurality of image signals;

a memory controller which reads the plurality of first sub image signals corresponding to the plurality of image signals stored in the memory unit and outputs the read first sub image signals, and subsequently reads the plurality of second sub image signals corresponding to the plurality of image signals stored in the memory unit and outputs the read second sub image signals after reading the plurality of first sub image signals; and a data driver which converts the first and second sub image signals output from the memory controller into the plurality of first sub data voltages and the plurality of second sub data voltages, and supplies the plurality of first sub data voltages and the plurality of second sub data voltages to the plurality of first sub-pixels and the plurality of second sub-pixels.

12. The display device of claim 6, wherein the plurality of rows of pixels each comprises first gate lines connected to the first sub-pixels, second gate lines connected to the second sub-pixels, and a plurality of data lines connected with the first sub-pixels and the second sub-pixels.

13. The display device of claim 6, wherein the first sub image signals and second sub image signals comprise different gray scales and the first sub data voltages and the second sub data voltages comprise different levels.

14. The display device of claim 13, wherein gray levels of the first sub image signals are greater than or equal to those of the image signals and gray levels of the second sub image signals are smaller than or equal to those of the image signals.

15. A method of driving a display device having first to nth rows of pixels, an ith pixel row ($1 \leqq i \leqq n$) of the first to nth rows of pixels including a plurality of pixels, each pixel having a first sub-pixel and a second sub-pixel, the method comprising:

receiving a plurality of image signals in a display driving unit of the display device;

converting the plurality of image signals into a plurality of first sub image signals and a plurality of second sub image signals;

supplying a plurality of first sub data voltages corresponding to the plurality of first sub image signals to the plurality of first sub-pixels of the ith pixel row; and supplying a plurality of second sub data voltages corresponding to the plurality of second sub image signals to the plurality of second sub-pixels of the ith pixel row, wherein a gate-on voltage is sequentially applied such that the first and second sub pixels are sequentially supplied with the first and second sub data voltages.

16. The method of claim 15, wherein the converting the plurality of image signals into a plurality of first sub image signals and a plurality of second sub image signals comprises:

reading the first and second sub image signals corresponding to the plurality of image signals from a look-up table;

outputting the plurality of first sub image signals; and outputting the plurality of second sub image signals.

17. The method of claim 15, wherein the converting the plurality of image signals into a plurality of first sub image signals and a plurality of second sub image signals comprises:

reading the plurality of first sub image signals corresponding to the plurality of image signals from a look-up table and outputting the read first sub image signals; and reading the plurality of second sub image signals corresponding to the plurality of image signals from the look-up table and outputting the read second sub image signals.

18. The method of claim 15, wherein gray levels of the first sub image signals are greater than or equal to those of the image signals and gray levels of the second sub image signals are smaller than or equal to those of the image signals.

* * * * *